(12) United States Patent
Marsden et al.

(10) Patent No.: US 9,572,041 B2
(45) Date of Patent: Feb. 14, 2017

(54) ROUTING

(71) Applicant: Eseye Limited, Surrey (GB)

(72) Inventors: Ian Marsden, Surrey (GB); Paul Marshall, Surrey (GB)

(73) Assignee: ESEYE LIMITED (GB)

( * ) Notice: Subject to any disclaimer, the term of this patent is extended or adjusted under 35 U.S.C. 154(b) by 0 days.

(21) Appl. No.: 14/723,823

(22) Filed: May 28, 2015

(65) Prior Publication Data

US 2015/0358828 A1   Dec. 10, 2015

(30) Foreign Application Priority Data

Jun. 10, 2014   (GB) .................................. 1410304.8

(51) Int. Cl.
| | | |
|---|---|---|
| H04W 4/00 | (2009.01) | |
| H04W 16/14 | (2009.01) | |
| H04W 8/08 | (2009.01) | |
| H04L 29/12 | (2006.01) | |
| H04W 88/16 | (2009.01) | |
| H04W 88/08 | (2009.01) | |

(52) U.S. Cl.
CPC .......... H04W 16/14 (2013.01); H04L 61/1511 (2013.01); H04W 4/005 (2013.01); H04W 8/08 (2013.01); H04L 61/3075 (2013.01); H04L 61/609 (2013.01); H04W 8/082 (2013.01); H04W 88/08 (2013.01); H04W 88/16 (2013.01)

(58) Field of Classification Search
CPC ........ H04W 16/14; H04W 8/08; H04W 4/005; H04W 88/16; H04W 88/08; H04L 61/1511

USPC ....................................................... 455/432.1
See application file for complete search history.

(56) References Cited

U.S. PATENT DOCUMENTS

| | | |
|---|---|---|
| 2004/0054794 A1 | 3/2004 | Lantto et al. |
| 2004/0228347 A1 | 11/2004 | Hurtta et al. |
| 2010/0211628 A1 | 8/2010 | Shah |
| 2012/0134319 A1 | 5/2012 | Kahn et al. |
| 2012/0322412 A1* | 12/2012 | Qiang .................. H04W 48/16 455/411 |
| 2013/0053029 A1* | 2/2013 | Anchan ............... H04W 76/022 455/432.3 |

FOREIGN PATENT DOCUMENTS

| | | |
|---|---|---|
| WO | WO 03/015353 | 2/2003 |
| WO | WO 03/058996 | 7/2003 |
| WO | WO 2007/104324 | 9/2007 |

(Continued)

OTHER PUBLICATIONS

Ericsson et al: "APN resolution for VoLTE", 3GPP Draft; S2-112272 DP-IMS-APN-Resolution, 3rd Generation Partnership Project (3GPP), Mobile Competence Centre ; 650, Route Des Lucioles ; F-06921 Sophia-Antipolis Cedex; France, vol. SA WG2, No. Xi 'An; 20110516, May 11, 2011 (May 11, 2011), XP050525300, [retrieved on May 11, 2011].

(Continued)

Primary Examiner — Tanmay Shah
(74) Attorney, Agent, or Firm — Leason Ellis LLP

(57) ABSTRACT

A method of routing a roaming cellular data terminal (12), for example an M2M device or telephone handset to an APN includes providing a DNS 20 in a roaming network 2 which resolves a FQDN to a local POP remote 22 from the home POP 18 in home network 6.

4 Claims, 1 Drawing Sheet

(56) References Cited

FOREIGN PATENT DOCUMENTS

WO    WO 2012/064980    5/2012

OTHER PUBLICATIONS

Ericsson et al: "APN resolution in the VPLMN if using LB0", 3GPP Draft; S2-113028 APN 23 060 Relio Revs, $3^{rd}$ Generation Partnership Project (3GPP), Mobile Competence Centre ; 650, Route Des Lucioles ; F-06921 Sophia-Antipolis Cedex; France, vol. SA WG2, No. Naantali; 20110711, Jul. 5, 2011 (Jul. 5, 2011), XP050548366, [retrieved on Jul. 5, 2011].

"Technical Specification 3rd Generation Partnership Project—Technical Specification Group Core Network and Terminals—Numbering, addressing and identification (Release 12)", at <<www.3gpp.org>>. Sep. 2013.

* cited by examiner

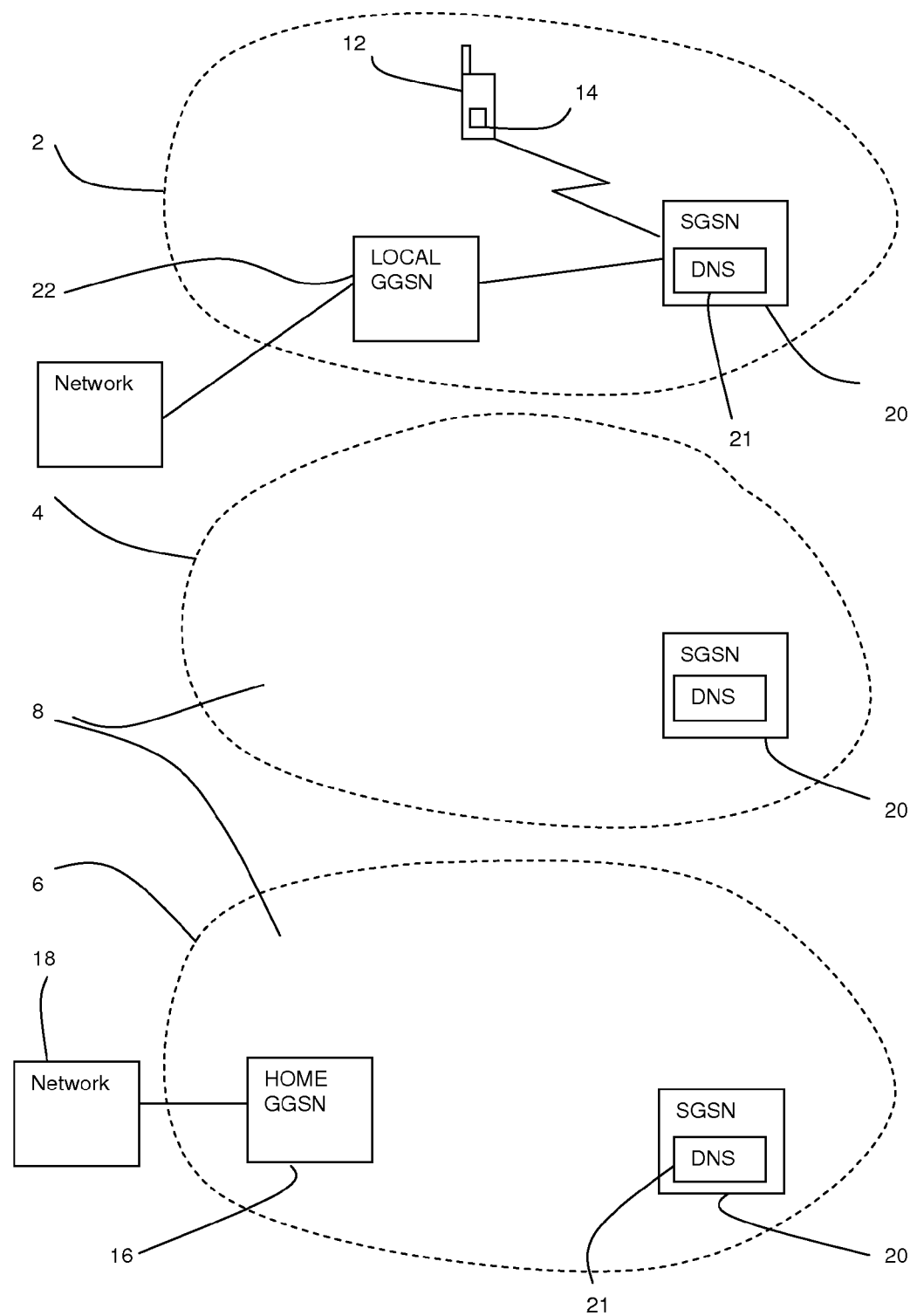

ROUTING

CROSS-REFERENCE TO RELATED APPLICATIONS

The present application claims priority under 35 U.S.C. §119 to British Patent Application No. 1410304.8, filed Jun. 10, 2014, which is hereby incorporated by reference in its entirety.

The invention relates to methods of operating a cellular or mobile device and apparatus for implementing the methods.

BACKGROUND ART

Conventionally, when a cellular modem wishes to access a packet session using for example GPRS, 3G or 4G technology the communication is to a specific network which has an access point, the name of the access point being known as an access point name, APN. This access point name is thus the name of an access point which connects to the packet network. Located at this access point is a Gateway GPRS Support Node, GGSN.

The mobile device reaches the appropriate GGSN through a Serving GPRS support node (SGSN) which is responsible for connecting to packet networks for mobile phones in a particular geographic location.

The protocols for the naming of these concepts, in particular the APN, are contained in the document 3GPP TS 23.003 V12.0.0 (2013-09). "Technical Specification 3rd Generation Partnership Project—Technical Specification Group Core Network and Terminals—Numbering, addressing and identification (Release 12)", at www.3gpp.org, which teaches the definition and syntax of a number of concepts as used in such technology.

The format of the APN (the name of the network) is as follows. The APN is identified with an APN Operator Identifier, APN-OI, which may be derived from the IMSI as mncMNC.mccMCC.gprs, described by 3GPPTS23.003V12.0.0.0. In this format, "mnc" is a string and MNC is the numeric identifier of the network within a country. Similarly "mcc" is a string and MCC the numeric identifier of the country. An example of an APN OI is mnc058.mcc234.gprs, which is an identifier of the APN (in this case of Manx telecom). This default APN OperatorIdentifier is used for roaming situations.

For example, using a general packet radio service, GPRS network, the user of the mobile device (or the software in the device) may select as the network the APN name "eseye.com". This corresponds to a particular GGSN which represents the link to that network.

The GGSN is identified by a fully qualified domain name FQDN. The FQDN is made up of the APN name followed by the APN-OI so that the resulting FQDN would in the example be eseye.com.mnc058.mcc234.gprs. This FQDN is transmitted by the mobile device to the local SGSN which looks up "eseye.com.mnc058.mcc234.gprs in a local domain name server. The domain name server returns the IP address of the corresponding GGSN and the SGSN then communicates the relevant data with the required GGSN using the returned IP address. In this way, packets from the mobile phone are routed to the correct GGSN where they are connected onwards to a local network or the internet.

SUMMARY OF INVENTION

According to the invention, there is provided a method of mobile communication according to claim 1.

By providing a local POP for the APN in some locations, DNS look up of the APN FQDN in domain name servers in those locations may be configured to point to a more local data POP.

This approach addresses three disadvantages of simply routing via the home network. When routing via the home network, the roaming partner network in general only has a billing relationship with the home network, so further bills must be generated against each session and issued to the home network. Further costs are incurred as the home network processes billing records to ascribe them to individual accounts. Further, where the devices are using local services, the transit costs can be significant to the local operator. This leads to rounding up of costs.

Such rounding can have a serious impact on some machine to machine, M2M, applications since tiny data packets are sent frequently, incurring significant costs.

By providing a local APN, billing can be dealt with more conveniently.

A bigger issue is the performance of an architecture which routes all data via the home network. Frequently, the data is generated and consumed in the same country, while a home network may be some distance away. If the home network is (for example) manx telecom, and the device is in use in South Africa, the data travels a 30 000 km round trip taking time, consuming network resources and risking data loss or complete failure.

By providing a local point of presence, POP, data routing is much less onerous

Some applications such as utility meter reading or healthcare applications may be subject to local regulations that do not permit the data to exit the country borders. Conventionally the advantages of a multi-network SIM card, can only be obtained by routing the data back from the network on which it is roaming, to the GGSN hosted by the Home Network. By providing a local point of presence, the data will remain in country and meet all legal requirements.

BRIEF DESCRIPTION OF DRAWING

Embodiments of the invention will now be described, purely by way of example, with reference to the accompanying drawing, FIG. 1, which illustrates a schematic of a number of networks according to the invention.

DETAILED DESCRIPTION

A plurality of networks 2, 4, 6 are each provided in respective geographic areas 8 operated by respective network operators.

A mobile device 12 has a SIM card 14 provided by a respective network operator or other supplier with a mobile country code, MCC and a mobile network code, MNC. A home GGSN 16 is provided which connects to network 18, which may in this instance be a private network, but may also be the public internet. The network 6 with the home GGSN is the home network 6. The home network also contains an SGSN 20 and corresponding domain name server DNS 21.

When the mobile device 12 wishes to make a packet connection to a network it generates a fully qualified domain name, FQDN. The FQDN defines a specific combination of internet address and network operator code. In the particular embodiment, consider the example that the mobile device wishes to connect to the network eseye.com. The FQDN for that APN is made by combining the mobile country code, MCC and the mobile network code, MNC of the home network operator (6), i.e. the operator supplying the SIM card, for example 234 58 so that the resulting fully qualified domain name FQDN would in this example be eseye.com.mnc058.mcc234.gprs. This defines both "eseye.com" and the corresponding network operator code. As implied by the name FQDN, the FQDN is a domain name and to find out the corresponding IP address of the domain name the domain name is resolved in the DNS.

When in the home network, the mobile device simply communicates the FQDN to the local SGSN 20 in home network 6 which resolves the FQDN in its DNS server 21, discovers the IP address of corresponding home GGSN and connects the mobile device to the GGSN 16. The GGSN 16 in turn connects to network 18.

Each network 2, 4, 6 has one or more SGSNs 20 each including a local DNS 21 which operate to look up DNS information for devices operating on the network. These servers may generally provided with conventional DNS information which may be obtained for example from DNS servers on the internet.

The embodiment as described to this point is conventional. However, conventionally DNS servers 21 will all resolve the same domain name to the same IP address.

In the present case, a GGSN 22 which may also be referred to as a point of presence 22 is provided in a first network 2 corresponding to a respective geographic region. The network 2 may be referred to as a roaming network, since it is not the home network 6 i.e. it is not the network operated by the network operator providing the SIM card 14.

The DNS 21 on that network has a DNS table that is not a simple copy of the global DNS. Instead, the DNS table entry in that network 2 for the FQDN of the home network operator corresponding to the mobile device and APN, for example eseye.com.mnc234.mcc058.gprs, is keyed not to the network address of the home GGSN 16 as in the conventional approach but instead to the local GGSN or POP 22.

It will be appreciated that this is not a normal DNS entry and accordingly the software in the DNS 21 must ensure that normal update rules for updating the DNS are not applied for the specific domain names concerned, i.e. for those domain names that are FQDNs corresponding to networks with a local POP 22.

In this way, when the mobile device operating in network 2 seeks to access the network 18, it communicates to local SGSN 20 the appropriate FQDN, for example eseye.com.mnc058.mcc234.gprs. The corresponding DNS 21 at network 2 provides the address of GGSN 22 in network 2 so communication is routed from SGSN 20 to the local GGSN 22 and not to the home GGSN 16.

If the mobile device then leaves the geographic area of network 2 and enters the geographic area of network 4, where there is no local POP for the relevant APN, then the DNS 21 in network 4 simply resolves the FQDN, for example eseye.com.mnc058.mcc234.gprs to the home GGSN 16.

This approach has a number of advantages.

The invention proposes that a local GGSN 22 may be provided in some locations, and that the DNS lookup of the FQDN be configured to point to a more local data POP.

Consider first the example of a device roaming on a network 2 where the provider already has a POP 22 for a particular APN. A specific example would be a Manx SIM roaming on Safaricom in Kenya. Thus, in this case the home network 6 is the Manx network and the network 2 is the Safaricom network. In this case, an arrangement is made that the DNS lookup for eseye.com.mnc058.mcc234.gprs on DNS server 21 in network 2 does not return the GGSN that routes to the address of the APN in the Isle of Man, but returns a GGSN that routes to the GGSN 22 operated by Eseye in a data centre in Kenya. This has the advantage that the home network 6 is not required to transit the data, and is charging only for providing HLR services whilst the roaming network 2 can charge the APN service provider directly for the data that travels across their network. Thus the application gains the benefits of locally routed data direct data pricing.

However, there is a further benefit to the application. Should the device go out of coverage of the partner network 2 described, for example to alternative network 4, a lookup for the APN in the DNS of network 4 will return the address of the instance of the APN routed via the home network infrastructure, i.e. the address of home GGSN 16. Thus, in spite of the unusual and non-standard DNS entries, service may be maintained.

As a second example, consider a device roaming on a network 4 physically, i.e. geographically, closer to the network 2 where the APN service provider has an POP 22 than the Home Network 6. In this alternative example, when the roaming Partner network 4 performs a DNS lookup of the FQDN of the APN, the DNS 21 in the SGSN in network 4 returns not the address of the home GGSN 16 in home network 6 which may be many thousand kilometres away, but returns instead the IP address of a more local instance in a nearby country, in the example GGSN 22 in network 2.

A further benefit is that should a particular instance of the GGSN need to be shut down for maintenance, or become overloaded, or even fail, a simple DNS change will allow devices to continue to operate through an alternative instance of the GGSN.

The invention claimed is:

1. A method of routing data from a mobile device operating on roaming network to a destination network having an access point name ("APN") and a corresponding destination network fully qualified domain name ("FQDN"), the method comprising:
   providing a home network that has a domain name server ("DNS"), the DNS operative to resolve the destination network FQDN to an IP address of a home Gateway GPRS Support Node ("GGSN") that provides access to the destination network;
   providing a DNS in the roaming network, the DNS on the roaming network operative to maintain routing tables that are distinct from those used by the DNS on the home network;
   providing a DNS entry in the DNS in the roaming network, the DNS entry operative to resolve the FQDN of the destination network to the IP address of a local GGSN on the roaming network, the local GGSN not being the home GGSN;
   receiving a communication from a mobile device operating in the roaming network that requests a connection to the destination network identified with the destination network FQDN; and
   connecting the mobile device to the local GGSN indicated in the DNS entry in the local network for routing communications to the destination network.

2. The method according to claim 1 wherein the local GGSN is geographically located in the service region of the roaming network.

3. The method according to claim 1 wherein the FDQN comprises a mobile country code ("MCC") and the mobile network code ("MNC") of the network operator operating the home network.

4. The method according to claim 1 comprising:
providing multiple roaming networks with a respective DNS, each respective DNS operative to maintain routing tables that are distinct from those used by the DNS on the home network and other respective DNS on the multiple roaming networks;
each respective DNS in each roaming network providing a DNS entry operative to resolving the FQDN of the destination network to the IP address of the a local GGSN;
receiving a communication from a mobile device operating in any of the said multiple roaming networks that requests a connection to the destination network identified by the destination network FQDN; and
connecting the mobile devices to the local GGSN for routing communications to the destination network.

* * * * *